Figure 1:
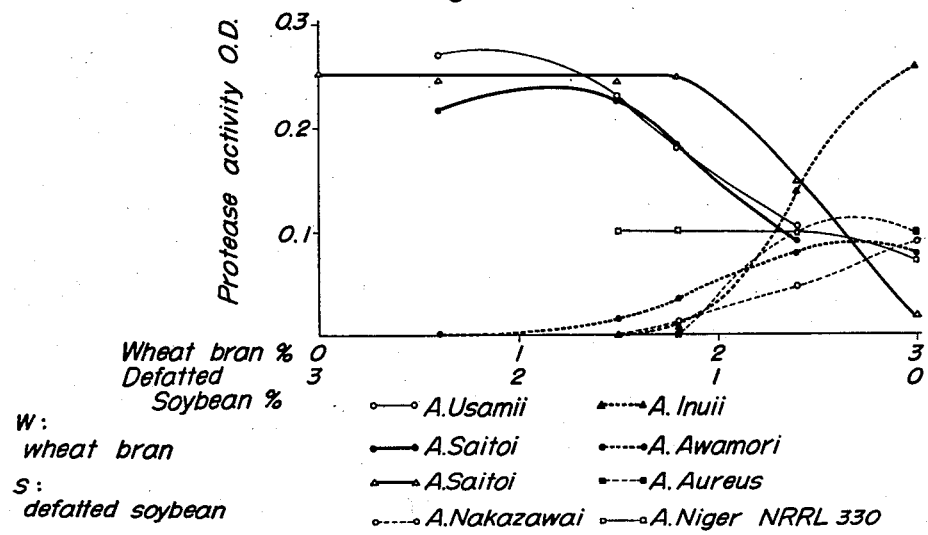

W: wheat bran
S: defatted soybean

○—○ A. Usamii   ▲----▲ A. Inuii
●—● A. Saitoi   ●----● A. Awamori
○—○ A. Saitoi   ●----● A. Aureus
○----○ A. Nakazawai   □—□ A. Niger NRRL 330

Added % per wheat bran wt.

Time (hr)
Wheat bran 1.8%, defatted soybean 1.2%

United States Patent Office 3,149,051
Patented Sept. 15, 1964

3,149,051
METHOD OF PRODUCING A PROTEOLYTIC ENZYME BY USE OF BLACK ASPERGILLUS TYPE MOLDS
Fumihiko Yoshida and Eiji Ichishima, both of Noda-shi, Japan, assignors to Noda Institute for Scientific Research, Noda-shi, Japan, a corporation of Japan
Filed Aug. 30, 1961, Ser. No. 135,416
10 Claims. (Cl. 195—65)

The present invention relates to a method of producing a proteolytic enzyme by use of black Aspergillus type molds. More particularly, it relates to the improvement in the production of an acid protease (optimum pH 2.7 for milk casein digestion) by a solid or liquid cultivation of black Aspergillus type molds, which improvement is in adding a considerable amount of an inorganic nitrogen source to the cultivation medium to exceedingly increase the production of the protease.

The present invention is an improvement of a method of U.S. Patent No. 2,848,371.

Concerning the formation of protease by use of Aspergillus molds, heretofore, there have been various researches on proteases having activity in neutral to alkaline ranges. As for the formation of protease having activity and optimum pH at approximately 3.0 and having resistivity to acid, the amount produced is smaller and the distribution of the molds producing the same is narrower. It was known that protease produced by black Aspergillus type molds has optimum activity at approximately pH 3.0 and is acid resistant. (See F. Yoshida, Bull, Agr. Chem. Soc. Japan 20, 252 (1956); U.S. Patent No. 2,848,371).

There has been little systematic investigation until now on the formation of the protease having optimum pH approximately at 3.0 and having resistivity to acid, excepting that Gorbach et al. have reported the formation of a protease by a cultivation in liquid, of *Aspergillus niger* having optimum pH approximately at 4.9. (See G. Gorbach and O. G. Koch, Arch. für Mikrobiologie 23, 265 and 284 (1955).)

The present inventors have discovered after systematic investigations of cultivating conditions for the production of the acid-resisting protease by use of black Aspergillus type molds belonging to Kuro-Koji mold group (see Sakaguchi, Iizuka, and Yamaguchi, J. Applied Mycology (Univ. of Hokkaido), 3, 54 (1949); ibid. 3, 97 (1950); and 4, 1 (1950); Journal of the Agricultural Chemical Society of Japan 24, 138 (1951)), that the production of the acid-resisting protease by use of black Aspergillus type molds can be exceedingly increased by as much as 40 to 90% compared with the control.

The positions of the molds in the classification of Aspergillus will be understood from the following table.
(K. Sakaguchi, H. Iizuka and S. Yamazaki: J. Agr. Chem. Soc., Japan, vol. 24, 138, 1951; and H. Iizuka: J. General and Applied Microbiology, vol, 1, No. 1, 10, 1955.)

(1) Conidial wall with coloured bars when mature— *A. niger* group.
(1) Conidial wall smooth, rough or rarely echinulate— Kuro-Koji mold group.
(2) Colonies black—(3).
(2) Colonies with brown or olive shades—(7).
(3) Assimilate nitrites [1]—(4).

[1] The assimilation of nitrites has been tested by the use of the media; sucrose, 30 gr.; NaNO$_2$, 1.5 gr.; K$_2$HPO$_4$, 1 gr.; KCl, 0.5 gr.; MgSO$_4$·7H$_2$O, 0.05 gr.; FeSO$_4$, 0.05 gr.; in distilled water 1 l. The species which assimilate nitrites grow readily in 1–2 days at 30–35° C., while the non-assimilating species show none or only scanty growth in the upper part of the agar slant even after 5–10 days.

(4) 1st sterigmata over 30μ—*A. Batatae*, Saito.
(4) 1st sterigmata 13–25μ—(5).
(5) Yellow pigment produced—*A. usamii* nov. sp.
(5) Yellow pigment not produced—*A. usamii* var. R–17 nov. var.
(3) Do not assimilate nitrites—(6).
(6) 1st sterigmata 15–23μ, conidiophore 2–3 mm. or more—*A. saitoi* nov. sp.
(6) 1st sterigmata up to 16μ, colonies somewhat mummy brown—*A. saitoi* var. R–16 nov. var.
(6) 1st sterigmata 10–13μ, condiophore under 1.5 mm., conidial head crowded—*A. saitoi* var. Kagoshima nov. var.
(1) Colonies with olive shades, assimilate nitrites—(8).
(8) Sterigmata mostly in double series but often mixed with single series in the same heads, 1st sterigmata 5μ—*A. inuii* nov. sp.
(8) Sterigmata in double series ordinary—*A. inuii* var. K–19 nov. var.
(8) Conidial heads scanty—*A. inuii* var. R–7 nov. var.
(7) Colonies with olive shades, assimilate nitrites—(8).
(9) Assimilate nitrites—*A. aureus* Nakazawa, *A. aureus* var. minor Nakazawa et Shimo, *A. awamori* var. *fumeus* Nakazawa et Shimo, *A. aureus* F. sp. R–2.
(9) Do not assimilate nitrites—(10).
(10) Yellow-orange pigment produced in mycelium, conidial heads not seen in ordinary colonies—*A. nakazawai* nov. sp.
(10) Yellow-orange pigment not produced—*A. awamori* Nakazawa et Shimo, *A. awamori* var. minimus Nakazawa et Shimo, *A. awamori* var. *piceus* Nakazawa et Shimo, *A. awamori* var. *fuscus* Nakazawa et Shimo, *A. aureus* var. *acidus* Nakazawa et Shimo, *A. awamori* var. *mirinus* Nakazawa et Shimo, *A. awamori* F. sp. R–5, R–9, H–2, and R–1.

It is an object of the invention to provide such improved method as can produce the protease having the activity approximately at pH 3.0 and having resistivity to acid, with an increased yield. Other objects will be apparent from the following descriptions.

To facilitate understanding of the invention, a concrete and illustrative explanation will be made firstly.

Strains employed in the following examples are of Kuro-Koji mold group preserved in the Institute of Applied Microbiology, University of Tokyo, of *Aspergillus flavasoryzae* preserved in the Arima Research Laboratory, University of Tokyo, and of *Aspergillus sojae* preserved in the Noda Institute for Scientific Research.

Enzymatic solution from solid cultivation is made as follows: Five grams of wheat bran is added with 3.5 ml. of water, and sterilized under pressure in the conventional way. Then, the bran is inoculated with a strain of a mold and incubated at 30° C. for about 64 hours. After extraction with 50 ml. of hydrochloric acidic water (pH 2.7) and filtration, the filtrate is diluted with N/10 acetate buffer (pH 2.7) up to ten times the volume to make an enzymatic solution. The amount of each compound added to the basal culture medium of wheat bran is by weight percent based upon the weight of the wheat bran.

Enzymatic solution from cultivation in liquor (submerged) is made as follows: Three grams of a mixture of wheat bran and defatted soybeans are added to 100 ml. of water in a 500 ml.-content shaking flask and sterilized under pressure in the conventional way. The mixture is inoculated with a strain of a mold and incubated at 30° C. on a shaking machine operated at 140 reciprocations per min. After the incubation for a definite period of time, the mixture is filtered, and the filtrate is diluted with N/10 acetate buffer (pH 2.7) up to ten times the volume to make an enzymatic solution.

The protease assay of the enzymatic solution in the invention is carried out as follows: The enzymatic solution containing the protease is made to act to a substrate of 2% milk casein (Hammarsten) at 30° C. for 10 min., according to the modified Anson's method. After removal of the precipitate formed by trichloroacetic acid by filtration, the filtrate has added thereto 1 ml. of Folin's reagent and the resultant color is colorimetrically measured at 660 m$\mu$ by use of a photometer (Hitachi Ltd., EPO-B type), showing as $\Delta$ O.D.

After preliminary experiments, it was found that 50 to 70% of water-spraying amount and cultivation conditions at temperature of 30° C. for 62 to 64 hours are adequate for the solid cultivation. Also, the relationship between the formation amount of the acid protease and the proportion of wheat bran to defatted soybeans was determined in the cultivation in liquid (submerged), for determination of the basal medium for various strains belonging to Kuro-Koji mold group. The results are shown in FIGURE 1. These results show that *Aspergillus usamii*, *Aspergillus saitoi* and others prefer nitrogen source in a more concentrated state, *Aspergillus inuii*, *Aspergillus nakazawai* prefers nitrogen source in a comparatively lower concentration, and *Aspergillus aureus*, *Aspergillus awamori*, and others prefer nitrogen of intermediate concentration.

moto et al. have found that addition of ammonium sulfate increased formation of the enzyme in case of Penicillium, i.e. by 122% based upon the control. (See J. Fermentation Technology 35, 386 (1957).)

In the following Table 1, typical strains black Aspergillus type molds belonging to Kuro-Koji mold group are listed, which give remarkably increased acid protease formation by addition of the inorganic nitrogenous source.

*Table 1.—Typical Strains Giving Increased Formation of the Acid Proease by Addition of Inorganic Ammonium Salts or Nitrates*

*Aspergillus usamii (ATCC No. 14331)*
*Aspergillus saitoi (ATCC No. 14332)*
*Aspergillus inuii (ATCC No. 14333)*
*Aspergillus aureus (ATCC No. 14334)*
*Aspergillus awamori (ATCC No. 14335)*
*Aspergillus nakazawai (ATCC No. 14336)*

Further, effects of inorganic nitrogen compounds to the formation of various kinds of proteases by use of black Aspergillus molds belonging to *Aspergillus saitoi*, Aspergillus molds belonging to *Aspergillus oryzae-flavus*, and other Aspergilli, are shown in Table 2. As seen from the table, addition of an inorganic nitrogen source does not increase acid protease in Aspergilli other than black Aspergillus molds, but increases alkaline protease of pH 7.5.

*Table 2.—Effect of Inorganic Nitrogen Compounds in the Formation of Proteases by Various Species of Aspergilli*

| Strain | Final pH [1] | | | Acid Protease | | | Neutral Protease | | | Alkali Protease | | |
|---|---|---|---|---|---|---|---|---|---|---|---|---|
| | Control | 1% NH₄Cl | 0.5% NaNO₃ | Control | 1% NH₄Cl | 0.5% NaNO₃ | Control | 1% NH₄Cl | 0.5% NaNO₃ | Control | 1% NH₄Cl | 0.5% NaNO₃ |
| A. saitoi | 3.8 | 4.3 | 3.8 | 0.600 | 0.946 | 0.932 | 0.008 | 0.006 | 0.008 | 0 | 0 | 0 |
| A. oryzae var. magnasporus | 6.2 | 6.8 | 6.7 | 0.223 | 0.158 | 0.127 | 0.343 | 0.328 | 0.517 | 0.266 | 0.263 | 0.450 |
| A. oryzae Wehmer | 5.9 | 6.2 | 6.2 | 0.100 | 0.071 | 0.077 | 0.155 | 0.101 | 0.168 | 0.100 | 0.054 | 0.130 |
| A. oryzae Wehmer | 6.1 | 6.0 | 6.2 | 0.115 | 0.089 | 0.097 | 0.204 | 0.143 | 0.226 | 0.133 | 0.091 | 0.282 |
| A. sojae | 6.4 | 6.0 | 6.4 | 0.025 | 0.027 | 0.008 | 0.221 | 0.096 | 0.225 | 0.180 | 0.089 | 0.270 |
| A. mellsus | 6.2 | 6.0 | 6.2 | 0.077 | 0.121 | 0.056 | 0.181 | 0.096 | 0.207 | 0.193 | 0.093 | 0.238 |
| A. ochracius | 6.4 | 6.0 | 6.6 | 0.056 | 0.061 | 0.020 | 0.237 | 0.082 | 0.269 | 0.232 | 0.108 | 0.294 |

[1] pH was measured with respect to the Koji extracts diluted by tenfold with water.

Now, effect of addition of various kind of nitrogenous compounds to formation of the acid protease of black Aspergillus type molds, according to the present invention, will be set forth below.

Figure 2:
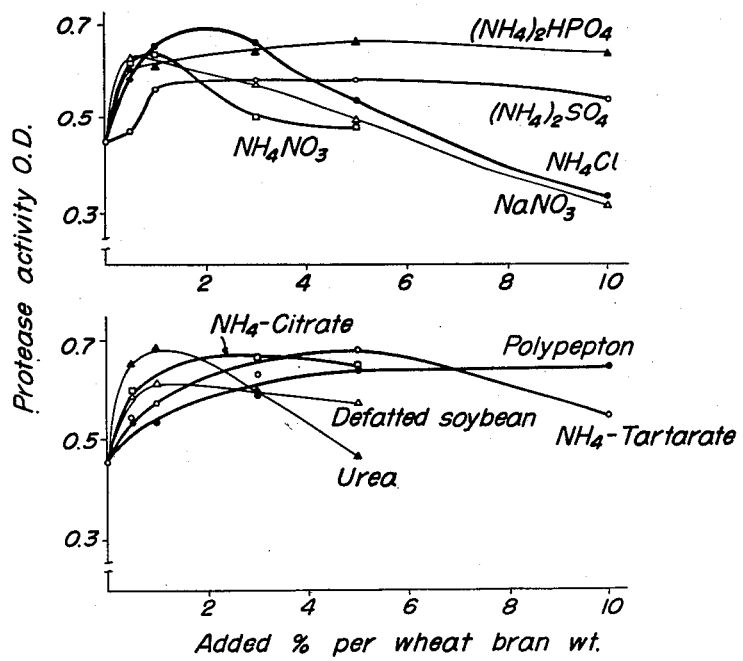

FIGURE 2 is a graph showing effect of addition of various kind of nitrogenous compounds to formation of the acid protease by use of *Aspergillus saitoi* in a solid cultivation. This experiment teaches that addition of various kind of nitrogenous compounds remarkably increases formation of the acid protease, that the preferable C/N ratio of the medium (ratio of carbon percent to nitrogen percent in the medium) somewhat varies according to the kind of nitrogenous compound, but it may generally be 8.5, and that, as to the kind, inorganic nitrogenous sources, such as nitrates and ammonium salts, are exceedingly effective to the protease formation even in a comparatively smaller amount. Thus, use of an inorganic nitrogenous source seems to be materially advantageous from economical points of view, over use of an expensive organic nitrogenous source.

Outside of the nitrogenous compounds, some of potassium salts, calcium chloride, and others seem to be slightly effective, but various carbon sources and various metallic salts are rather inhibitory to the formation of the protease.

Figure 3:
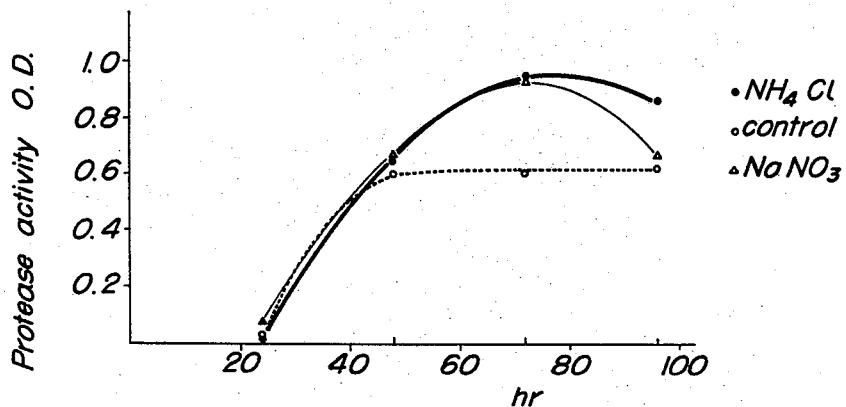

FIGURE 3 is a graph showing the variation of the amount of the acid protease formed as time elapses, in the cases where 0.5% of sodium nitrate and 1% of ammonium chloride are respectively added.

There have not been many reports that teach efficacy of addition of inorganic nitrogenous source in solid cultivation for the formation of acid protease. Merely, Saka- To form acid protease from black Aspergillus molds by cultivation in liquid (submerged) according to the invention, various concentrations of inorganic nitrogenous sources, i.e. ammonium chloride or sodium nitrate, are added to the above-identified medium containing organic nitrogenous source in a higher concentration. The results in case of using a black Aspergillus mold, *aspergillus saitoi* are shown in the following Table 3.

*Table 3.—Effect of Concentration of Inorganic Nitrogen Compounds in the Medium to Acid Protease Formation by use of Asp. saitoi (30° C., 87 hrs., 140 r.p.m.)*

| Addition of Nitrogen Compounds, Percent | Ammonium chloride | | | | Sodium nitrate | | | |
|---|---|---|---|---|---|---|---|---|
| | C/N | pH | Protease | Yield, Percent | C/N | pH | Protease | Yield, Percent |
| Control 0 | 3.15 | 4.7 | 0.268 | 100 | | | | |
| 0.25 | 2.18 | 4.7 | 0.324 | 128 | | | | |
| 0.5 | 1.60 | 4.5 | 0.372 | 139 | 2.41 | 4.3 | 0.252 | 94 |
| 1.0 | 1.07 | 4.5 | 0.416 | 155 | 1.95 | 4.5 | 0.322 | 120 |
| 1.5 | 0.80 | 4.6 | 0.424 | 158 | 1.42 | 4.0 | 0.380 | 142 |
| 2.0 | 0.64 | 4.8 | 0.412 | 154 | 1.17 | 4.6 | 0.396 | 148 |
| Defatted Soybean: | | | | | 0.91 | 4.3 | 0.378 | 141 |
| 0.5 | 2.70 | 3.8 | 0.235 | 87.7 | | | | |
| 1.0 | 2.39 | 3.6 | 0.229 | 85.4 | | | | |

The C/N ratio in the medium used in the experiment is far lower than that known heretofore (namely the medium containing much more concentrated nitrogen). It is found from the experiment that an exceedingly excellent and maximum yield is obtained when 1% of ammonium chloride or sodium nitrate is added to the basal medium containing a concentrated organic nitrogen, compared with the control.

When exoleated (defatted) soybeans, one of the organic nitrogenous sources, is added to the control, the yield is lower than in the control.

The formation of acid protease in the foregoing basal media (C/N ratio is 3.2) to each of which has been added 1% of various kinds of organic ammonium salts and nitrates is tested by shaking cultivation for 63 hours and 87 hours. The results are set forth in Table 4.

*Table 4.—Effect of Various Kinds of Inorganic Nitrogen Compounds (1%) Added to the Medium to Acid Protease Formation by Use of Asp. saitoi (30° C., 140 r.p.m.)*

| Nitrogen comp. | 63 hrs. | | | | 87 hrs. | | |
|---|---|---|---|---|---|---|---|
| | C/N | pH | Protease | | pH | Protease | |
| | | | O.D. | Yield | | O.D. | Yield |
| Control | 3.15 | 3.5 | 0.150 | 100 | 3.9 | 0.181 | 100 |
| NH₄Cl | 1.07 | 4.3 | 0.261 | 174 | 4.7 | 0.334 | 174 |
| (NH₄)₂SO₄ | 1.22 | 3.9 | 0.229 | 153 | 4.4 | 0.275 | 138 |
| NH₄NO₃ | 0.87 | 4.1 | 0.199 | 132 | 4.8 | 0.328 | 165 |
| (NH₄)H₂PO₄ | 1.65 | 3.6 | 0.181 | 124 | 4.1 | 0.330 | 166 |
| (NH₄)HPO₄ | 1.22 | 4.0 | 0.058 | 39 | 3.6 | 0.282 | 142 |
| NaNO₃ | 1.42 | | | | 4.1 | 0.269 | 149 |
| KNO₃ | 1.55 | | | | 4.0 | 0.239 | 132 |
| NH₄-citrate | 1.64 | 3.8 | 0.067 | 44 | 3.8 | 0.244 | 122 |
| NH₄-tartarate | 1.48 | 4.2 | 0.018 | 73 | 4.2 | 0.246 | 124 |

The experiment shows that each addition of ammonium salt increases formation of the acid protease already within a short cultivation period, and that in every case addition of inorganic nitrogenous sources gives 40–80% increased yields after 87 hours' cultivation.

Figure 4:
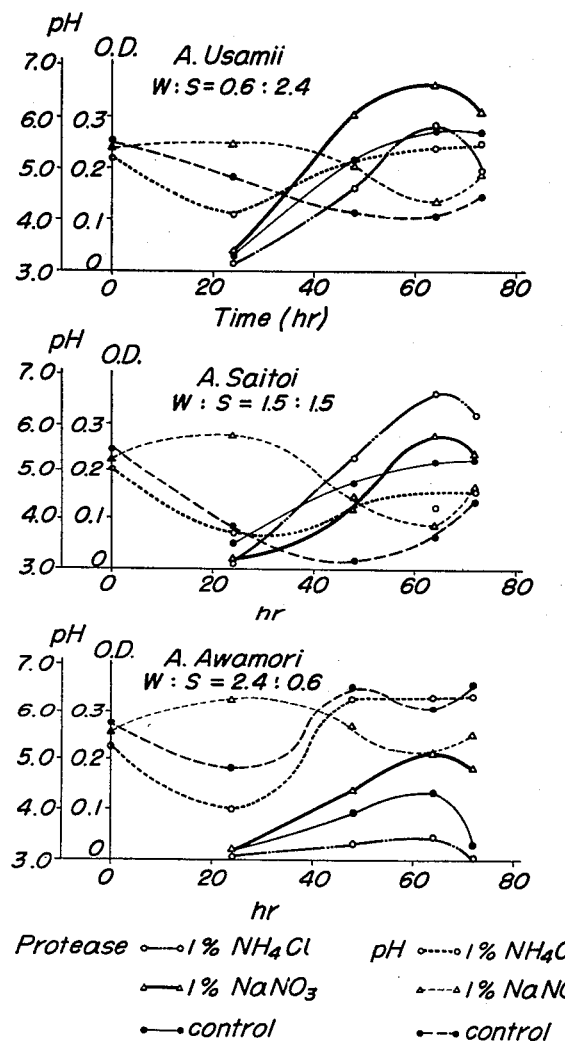

FIGURE 4 consists of graphs showing variation of the amount of acid protease formed as time elapses, in cases of adding 1% of an ammonium salt and adding 1% of a nitrate.

Figure 5:
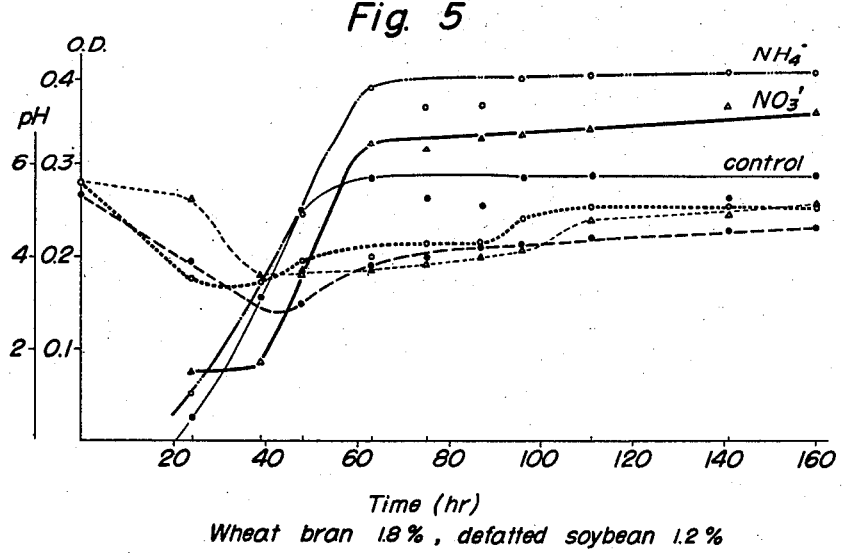

Various types of molds belonging to Kuro-Koji mold group are cultivated in a liquid medium under the aforesaid optimum culture condition having a lowered C/N ratio by addition of inorganic nitrogen sources. The results for formation of acid protease are shown in the following Table 5.

by black Aspergillus molds belonging Kuro-Koji mold group in a cultivation in liquid, as follows. The present protease having resistivity to acid is stable within a broad pH range of 2.5 to 6.0 when a substrate is present. (See F. Yoshida and M. Nagasawa, Bull. Agr. Chem. Soc. Japan 20, 257 (1956)). The variations of pH, as time elapses, in cultivations of *Aspergillus saitoi* in a medium containing a highly concentrated nitrogen and in the same added further with inorganic nitrogenous sources are shown in FIGURE 5. In general, the pH decreases to pH 3.0 to 4.0 after about 40 hours, and, thereafter, gradually increases to about 5.0. In the case where a nitrate is added, however, the decrease in pH tends to be somewhat delayed until 40 hours, during which time, the curve has a similar configuration as that of the control. It has been said heretofore that a medium inclines to acidity by addition of a physiologically acidic salt, and inclines to alkalinity by addition of a physiologically alkaline salt. But no remarkable change is observed in the formation of acid protease in a medium containing a highly concentrated nitrogen added with various kind of salts using black Aspergillus type molds, such as *Aspergillus usamii, Aspergillus saitoi* and the like. In case of *Aspergillus aureus, Aspergillus awamori, Aspergillus inuii,* and the like, a rapid increase in pH is observed after 60 hours, and the acid protease found is rapidly decreased with increase of the pH to 6.0 or higher.

Accordingly, pH in the formation of acid protease using black Aspergillus type molds is to be so controlled that initial pH is adjusted to about 6.0 which is suitable for germination of black Aspergilli, that the lowest pH reached after about 40 hours is controlled so as not to be lower than 2.5, and that the cultivation after about 40 hours is carried out within the pH range of 2.5 to 6.0, within which the acid protease of black Aspergilli is stable.

What we claim is:

1. A process for making acid-protease having an optimum pH of about 2.7 which comprises cultivating *Aspergillus usamii* in a medium containing inorganic nitrogen source in an amount such that the C/N ratio of the medium is below 3.2 at about 30° C. for at least 60 hours.

2. A process for making acid-protease having an optimum pH of about 2.7 which comprises cultivating

*Table 5.—Effect of Inorganic Nitrogen Compounds in the Medium for the Formation of Acid Protease by Various Kinds of Black Aspergilli (30° C., 64 hrs., 140 r.p.m.)*

| Strain | Control | | | | 1% Ammonium chloride | | | | 1% Sodium nitrate | | | |
|---|---|---|---|---|---|---|---|---|---|---|---|---|
| | C/N | pH | Protease | | C/N | pH | Protease | | C/N | pH | Protease | |
| | | | O.D. | Yield, percent | | | O.D. | Yield, percent | | | O.D. | Yield, percent |
| A. usamii | 1.48 | 4.1 | 0.271 | 100 | 0.63 | 5.4 | 0.286 | 106 | 0.81 | 4.3 | 0.382 | 141 |
| A. saitoi | 3.15 | 3.6 | 0.265 | 100 | 1.07 | 4.0 | 0.392 | 148 | 1.42 | 3.7 | 0.329 | 124 |
| A. aureus | 4.70 | 6.8 | 0.100 | 100 | 1.33 | 4.5 | 0.058 | 58 | 1.81 | 6.5 | 0.115 | 115 |
| A. awamori | 4.70 | 6.0 | 0.134 | 100 | 1.33 | 6.2 | 0.044 | 33 | 1.81 | 5.2 | 0.210 | 157 |
| A. niger NRRL-330 | 2.62 | 6.6 | 0.021 | 100 | 0.95 | 7.1 | 0.010 | 48 | 1.29 | 6.5 | 0.023 | 110 |
| A. japonicus | 7.58 | 5.4 | 0.019 | 100 | 1.64 | 3.5 | 0.025 | 132 | 2.31 | 6.1 | 0.016 | 84 |

Until now, there are a number of researches on control of pH in cultivation in liquid of fungi, for example, as to α-amylase of *Aspergillus niger* NRRL–337 (E. H. Le Mense et al., J. Bact. 54, 149, 47), as to acid α-amylase of *Aspergillus awamori* var. *fumeus* (Minoda, J. of Agr. Chem. Soc. of Japan, 35, 479 and 481 (1961)), as to protease of *Aspergillus oryzae* (M. E. Maxwell, Aust. J. Sci. Res. B5, 42 (1952)), and as to protease of *Aspergillus niger* (G. Gorbach and O. G. Koch, Arch. für Mikrobiol. 23, 265 (1955)).

The inventors have considered on effect of pH to formation of acid protease having the optimum pH at 2.7

*Aspergillus saitoi* in a medium containing inorganic nitrogen source in an amount such that the C/N ratio of the medium is below 3.2 at about 30° C. for at least 60 hours.

3. A process for making acid-protease having an optimum pH of about 2.7 which comprises cultivating *Aspergillus aureus* in a medium containing inorganic nitrogen source in an amount such that the C/N ratio of the medium is approximately 5 at about 30° C. for at least 60 hours.

4. A process for making acid-protease having an optimum pH of about 2.7 which comprises cultivating *Asper-*

*gillus awamori* in a medium containing inorganic nitrogen source in an amount such that the C/N ratio of the medium is approximately 5 at about 30° C. for at least 60 hours.

5. A process for making acid-protease having an optimum pH of about 2.7 which comprises cultivating *Aspergillus inuii* in a medium containing inorganic nitrogen source in an amount such that the C/N ratio of the medium is approximately 8 at about 30° C. for at least 60 hours.

6. A process for making acid-protease having an optimum pH of about 2.7 which comprises cultivating *Aspergillus nakazawai* in a medium containing inorganic nitrogen source in an amount such that the C/N ratio of the medium is approximately 8 at about 30° C. for at least 60 hours.

7. A process for making acid-protease having an optimum pH of about 2.7 which comprises the liquid cultivation of *Aspergillus saitoi* in a medium containing about 1.0% ammonium chloride based on the weight of the liquid medium at about 30° C. for at least 60 hours.

8. A process for making acid-protease having an optimum pH of about 2.7 which comprises the liquid cultivation of *Aspergillus saitoi* in a medium containing about 1.0% sodium nitrate based on the weight of the liquid medium at about 30° C. for at least 60 hours.

9. A process for making acid-protease having an optimum pH of about 2.7 which comprises the liquid cultivation of *Aspergillus usamii* in a medium containing about 1.0% ammonium chloride based on the weight of the liquid medium at about 30° C. for at least 60 hours.

10. A process for making acid-protease having an optimum pH of about 2.7 which comprises the liquid cultivation of *Aspergillus usamii* in a medium containing about 1.0% sodium nitrate based on the weight of the liquid medium at about 30° C. for at least 60 hours.

References Cited in the file of this patent

UNITED STATES PATENTS 2,848,371     Yoshida ---------------- Aug. 19, 1958

OTHER REFERENCES

Australian Journal of Biological Sciences 6, 410–427 (pp. 411 and 416 particularly relied on), August 1953.